United States Patent [19]

Hirsch

[11] Patent Number: 5,593,714
[45] Date of Patent: Jan. 14, 1997

[54] METHOD OF PRESSURE PRESERVATION OF FOOD PRODUCTS

[76] Inventor: Gerald P. Hirsch, 3136 Brook Dr., Decatur, Ga. 30033-3912

[21] Appl. No.: 349,937

[22] Filed: Dec. 6, 1994

[51] Int. Cl.$^6$ .......................... A23L 3/015; B65B 55/00; B65B 31/00
[52] U.S. Cl. .................. 426/268; 426/262; 426/270; 426/324; 426/392; 426/410; 426/413; 422/1
[58] Field of Search .................... 426/392, 410, 426/268, 324, 262, 270, 413; 422/1, 39

[56] References Cited

U.S. PATENT DOCUMENTS

| | | | |
|---|---|---|---|
| 1,711,097 | 4/1929 | Kratzer | 422/39 |
| 4,038,028 | 7/1977 | Roche . | |
| 4,804,402 | 2/1989 | Joubert . | |
| 5,147,613 | 9/1992 | Heilmann et al. . | |
| 5,228,394 | 7/1993 | Kanda et al. . | |
| 5,288,462 | 2/1994 | Carter et al. . | |
| 5,316,745 | 5/1994 | Ting et al. . | |
| 5,328,703 | 7/1994 | Nakagawa et al. . | |

FOREIGN PATENT DOCUMENTS

| | | | |
|---|---|---|---|
| 480422 | 4/1992 | European Pat. Off. | 426/410 |
| 59-210873 | 11/1984 | Japan | 426/410 |
| 62-066862 | 3/1987 | Japan | 426/410 |
| 1-314557 | 12/1989 | Japan | 426/410 |
| 2-150264 | 6/1990 | Japan | 426/410 |
| 2-171172 | 7/1990 | Japan | 426/410 |
| 2-231063 | 9/1990 | Japan | 426/410 |
| 2-257864 | 10/1990 | Japan | 426/410 |
| 2-257865 | 10/1990 | Japan | 426/410 |
| 5-091467 | 4/1991 | Japan | 426/410 |
| 3-87165 | 4/1991 | Japan | 426/410 |
| 3-183438 | 8/1991 | Japan | 426/410 |
| 3-183436 | 8/1991 | Japan | 426/410 |
| 3-183435 | 8/1991 | Japan | 426/410 |
| 3-280869 | 12/1991 | Japan | 426/410 |
| 4-304838 | 10/1992 | Japan | 426/410 |
| 5-252921 | 10/1993 | Japan | 426/410 |
| 5-284949 | 11/1993 | Japan | 426/410 |
| 6-030696 | 2/1994 | Japan | 426/410 |

OTHER PUBLICATIONS

Food Technology Mar. 1989 pp. 89–107.
Food Technology Jun. 1993 pp. 170–172.
J. of Jap. Soc. Of Food Science and Technology 1993 40(6) 406–413 (Dialog Abstract Only).
Deutsche Lebensmittel–Rund Schau 1992, 88(3) 74–76 (Dialog Abstract Only).
Japanese Packaging Report (23) 1991 p. 11 (Dialog Abstract Only).
Int'l J. Of Food Microbiology 12(1991) pp. 207.

*Primary Examiner*—Steven Weinstein

[57] ABSTRACT

Foods and food ingredients are sterilized and preserved by the application of pressure of 250 KPa (25,000 psi) for 5 days. Some seafood requires maintenance of pressure for the duration of storage. For most fruits and vegetables ripening is stopped by the pressure treatment and packaged products can be stored without refrigeration for at least 6 months. Because no heat is used foods retain much of their firmness and texture.

6 Claims, No Drawings

METHOD OF PRESSURE PRESERVATION OF FOOD PRODUCTS

Related Applications: none

This invention relates to the sterilization and preservation of objects, liquids and foods through the inhibition of microbiologcal growth and the killing of micro-organisms, spores, viruses and macro-organisms by the application of pressure. The methods and machines described allow production of unique products by manual means without the application of heat, radiation or chemical preservatives.

BACKGROUND

Proper food preservation is an important activity because in addition to providing palatable and nutritional products it protects people and animals for food born diseases, especially bacteria, fungi, and parasites. It also prevents the productions of toxins after harvest and provides for extended usage of food resources. Drying, salting and smoking are ancient methods. Canning is one of the major methods which allows extended shelf life of foods. Sterilization with heat in plastic packaging is a more recent successful method. Newer promising methods include radiation and even high magnetic fields can reduce the bacterial counts for some organisms. Freezing is an expensive method of preserving, transporting, marketing and storing foods and the cellular destruction of food which occurs when foods are frozen is undesirable.

It was discovered early in this century that only a limited number of foods could be sterilized by pressure alone (Hite et al 1914) Peaches and pears were preserved and stored for 5 years, after treatment of about 400 MPa. (40,000 psi). Apple juice with natural flora treated at pressures above 400 MPa for ½ to 2 hours did not ferment. By contrast fermentation of blackberries and raspberries usually occurred after similar treatment. Very few samples of tomatoes subjected to 680 Mpa (68,000 psi) for 1 hour were sterilized. Every sample of peas, beans, beets or other vegetables spoiled after such treatment. Because of this work, for many years little attention was paid to this potential method of food preservation.

Recently orange juice, kiwi jam, and strawberry jam were successfully preserved by pressure treatment (Hayashi, 1990).

The pressure treatment of a some micro-organisms to pressures of 90 MPa (600 atmospheres) for 2 days caused growth-cessation. These species included, *Alcaligenes viscosus, Bacillus subtilis, Escherichia coli, Micrococcus luteus, Mycobacterium phlei, Proteus vulgarius, Pseudomonas fluorescens, Sarcina lutea, Serriatia marcescens, Staphylococcus aureus, Streptococcus lactis, Hansenula anaomala, Saccharomyces cerevisiae* and *Torula cremoris* (ZoBell and Johnson. 1949). For shorter periods and higher pressures sterility is not obtained for many bacterial species. Salmonella recover to 0.1% of initial number in 4 hours after a 30 minute exposure to 510 MPa (3,400 atmospheres, 51,000 psi). Saccharomyces cerevisiae are killed in apple juice, orange juice and cranberry juice in 30 minutes at about 450 MPa (3,000 atmospheres, 45,000psi) but not at about 300 MPa (2,000 atmospheres, 30,000 psi).

The reason for very limited success in preservation of foods by pressure alone is the resistance of spores of many strains of bacteria to great pressure. For example 10% of spores of *Bacillus cereus* survived pressure of 900 MPa (6,000 atmospheres 90,000 psi)(Shigehisa, et al, 1991 ).

Spores of *Bacillus coagulans* are reduced by 90% at 450 MPa (3,000 atmospheres, 45,000 psi) for 30 minutes, but higher pressure had even less killing effect (Gould and Sale, 1970). Spores of *Bacillus cereus* and *Bacillus polymyxa* survive at 1% to 2% after ambient temperature pressurization to 300 MPa (2,000 atmospheres, 30,000 psi)for 1 hour while 100% of *Bacillus subtilis* A spores survive under these conditions (Gould and Sale, 1970 ).

Bacteria can be destroyed if exposed to gas under pressure when the pressure is released and the gas expands. In this procedure nitrogen gas is mixed with bacteria so that under pressure the nitrogen dissolves with the bacteria so that at the time of rapid release the nitrogen forms a gas within the bacteria causing them to break apart. U.S. Pat. No. 1,711,097 to Kratzer illustrates such a method.

U.S. Pat. No. 5,316,745 to Ting and Raghavan discloses a method without examples of sterilization with pressure at very high ranges from 40,000 to 55,000 psi. The inventor state that "a series of pressurizations has been found to be more effective in killing or disabling the organisms" and teach that the pressurization cycles be repeated until sterilization is complete. No minimum time holding at high pressure is taught. The method claim includes a step "c" for exporting and importing material to be sterilized.

U.S. Pat. No. 5,288,462 to Carter and Brazell discloses a method for sterilizing materials which involves very rapid decompression, from 1 to 10 milliseconds. This method apparently works at pressures as low as 1,000 psi. The method was applied to dental instrument sterilization and the effect of rapid decompression on food appearance and quality is not known.

U.S. Pat. No. 5,228,394 to Kanda, et al, describes but does not claim a three chamber system method in which food liquids such as fruit juice, milk, and sake are pressurized to a pressure of 2,000 to 4,000 atmospheres (30,000 psi to 60,000 psi) for 5 to 20 minutes.

Because of such reports and experience no general method has been developed for the use of hydrostatic pressure to preserve foods.

SPECIFICATION

It is an objective of this invention to provide methods which can be used to sterilize a large variety of foods and food components. It is a further objective of this invention to provide a method for sterilization of inanimate objects. It is also a purpose of this invention to provide a means for killing potentially disease causing micro-organisms and macro-organisms such as parasites, worms, worm eggs and the like by the application of pressure. The methods described to preserve foods also provide a firmness of quality, prevent the ripening of some fruits and vegetables and allow preservation of food components such as mayonnaise and salad dressing which cannot be preserved by freezing methods.

For the purposes of this invention the following terms are defined:

"Foodstuff" is an art recognized term which denoted, foods and food materials which alone or in combination with other substance which have nutritional or flavor value are suitable for consumption by humans.

"Feedstuff" is an art recognized term which denotes food materials similar to foodstuff which is suitable for consumption by animals.

"High pressure" means pressure of at least 200 MPa (20,000 pounds per square inch).

"Sterile" means no bacterial, fungal or other growth of life forms excluding viruses for a period of at least 30 days.

"Matter" means liquid and viscous materials such as but not limited to ground water, well water, river water, liquid suspensions, facial cretans, gels, juices, bread dough, sewerage; and solid objects such as but not limited to whole and cut fruits and vegetables, meat, cheese, baked goods like tortillas; and materials and items compatible with aqueous solutions in need of sterilization such as but not limited to moist towels, surgical instruments, syringes and needles.

"Foodstuff" means a substance incorporated into or in whole or in part to be eaten by man.

"Feedstuff" means substance to be added to or in whole or in part to be eaten by animals, excluding man.

"Nutrient materials" means substances in whole or in part which are to be used for the growth of living organisms, including but not limited to viruses, plants, sprouts, bacteria, fungi, invertebrates, and vertebrates.

The successful preservation of food is shown by the following examples. Example 1 consists of the preservation of fruit samples held for a period of 5–8 days at a pressure of 250 Mpa (25,000 psi) at ambient temperature ( 18–23 degrees C.) using commercially available plastic which is scaled by heat. Such systems are used in home freezing and cooking and allow a heated electrical bar to be pressed against the plastic opening to allow a fusing of the plastic for the front and back layers. Similar types of plastic can be sealed by hand with the appropriate type of closure system such as that seen in the plastic zipper type systems available commercially. Evidence of bacterial growth was established by formation of gas in the bag, cloudiness in the water solution surrounding the fruit rotting smell or disintegration of the food. To help preserve the appearance of pealed fruit a commercially available vitamin C and citric acid mixture was added to the water portion of the package in the amount of 1 teaspoon powder per cup of water. This solution was added in an amount which allowed the fruit to be covered when air was expelled during the sealing of the package. In preserving fruit cut to the size of the package added solution is not needed and the vitamin C citric acid mixture can be added in powder form to prevent surface discoloration. Most samples were preserved in packets ranging is sizes form about 1 inch square to 2 in by 5 inches (a whole egg). Samples were pressure treated in a commercial pressure device manufactured by Autoclave Engineers having a chamber capacity of about 3 liters. Pressurization was developed by a primary compressed air system and the equilibrium pressure was achieved in 3 to 5 minutes. Decompression was undertaken smoothly over a period of about 10 to 30 seconds. Oil was used eternally of the sealed plastic packets used in packaging foodstuff, to prevent corrosion of the metal components. Water is preferred to oil for this purpose in commercial settings because it is necessary to remove external oil for observation and product evaluation.

EXAMPLE 1

Successful Sterilization of Fruits

```
apricot
black grape
blueberries
kiwi
mango (early ripeness)
peach
pear
```

In general, pressure treatment stops the ripening process. In most cases the fruit preserved is firm after the pressure is reduced and the samples remain firm during storage. This a very desirable feature of this preservation process because firm and crunchy fruits are preferred by many people and the quality of the preserved fruit is much closer to fresh fruit than is canned fruit. Even frozen fruit has a tendency to become soft because the freezing process causes cellular breakage as the ice expands. Thus some pressure preserved fruit is better than either canned and frozen product.

In a preferred embodiment fruits are preserved without addition of extra water of solution and the fruit is cut to fit the package. To reduce external discoloration vitamin C, citric acid, or both are added in powdered form or as a concentrated solution to the solid fruit.

In another preferred embodiment whole, peeled or cut fruit is surrounded by a solution of vitamin C, citric acid, or both in a concentration sufficient to prevent or reduce discoloration. Amounts of from 1/10 teaspoon to 2 teaspoons per cup will be sufficient for most purposes. Preparation of food for preservation should be done with routine hygienic methods to reduce contamination. Water sources should be pathogen free, utensils should be disinfected and hands should be cleaned regularly and gloves should be worn and routinely disinfected.

EXAMPLE 2

Unsuccessful Preservation of Fruits

```
very ripe mango-extensive discoloration
white grapes-turned brown
```

White gapes were successfully preserved by surrounding them with yogurt but they still discolored to a brown color.

For several type of bacteria which grew after pressure treatment it was discovered that yogurt could stop or prevent bacterial growth. Three sources, those present in fresh corn, market obtained beef and market obtained chicken, were not able to grow when place in yogurt and repressurized. Either the acidity of the yogurt culture or yogurt component may be responsible for this effect. The following products were successfully preserved in pressure treatment when surrounded by about 20% by volume yogurt and pressurized for 5 to 8 days at 250 KPa (25,000 psi).

EXAMPLE 3

Successful Sterilization of Vegetables & Mushrooms

```
bell pepper
black eye peas
cabbage
cucumber
banana (some external darkening)
hot pepper (darkened)
shitaki mushroom
snow peas
soybeans
spinach
tomato
Woodear mushroom
```

In general above ground harvested vegetables are prevented from further ripening and preserved with considerable firmness when preserved at a pressure of 25,000 psi for 5 to 8 days. Example 3 list some vegetables successfully preserved. Green vegetables have a tendency to become lighter in color and some darker green ones turn brownish. Shitaki and Woodear mushrooms change little in color. Spinach becomes dark but does not disintegrate. Cilantro is sterilized but has little structure left after pressure treatment. Common button mushroom are sterilized by pressure treatment but turn black after treatment. These blackened mushroom are not a good substitute for fresh mushrooms. Bell pepper becomes lighter in color but remains firm for at least 8 months. Cabbage remains hard in texture for at least 5 months but loses its green color. Tomato retains a red color if treated with vitamin C-citrate mixture but otherwise darkens somewhat.

Root vegetables are usually preserved well if peeled. Example 4 list some of the root vegetables which are successfully preserved by 5 to 8 day pressure treatment at 25,000 psi.

EXAMPLE 4

Successful Sterilization of Root Vegetables

```
diakon (peeled)
carrots (peeled)
onion (peeled)
garlic (peeled)
potato (with skin) and Citrate 3%, pH 7
```

All five examples of root vegetables remain firm after preservation. The diakon became darker in color that the white color originally preserved. The potato sample was a small red (new) potato which was not sterilized when surrounded by water alone. It is known that bacterial spores are stabilized by having about 8% by weight of a calcium dipicolinate acid salt. Citrate is a known calcium chelator and this ability may cause some resistant spores to becomes sensitive to pressure killing by interfering with the calcium pinicolate protection.

EXAMPLE 5

Unsuccessful Sterilization of Vegetables

```
Yucca
Jerusalem artichoke
Potato in water (unpeeled)
```

A number of root vegetables are not sterilized by pressure for 5–8 days at 25,000 psi. This may be due to spores in the soil that are resistant to the treatment. In the above examples of successful preservation the contaminating soil was removed by peeling. Example 5 list examples of root vegetables which having external surface present were not sterilized by this pressure treatment protocol.

In addition to fruits, vegetables, fish, and meat, solid foods, semisolid and liquid foods and prepared foods are sterilized by pressure treatment at 25,000 psi for 5–8 days. Example 6 list some of these products.

EXAMPLE 6

Successful Sterilization of Solid, Semisolid and Liquid Foods

```
butter (semisolid)
cheese (semisolid)
chicken salad with mayonaise (semisolid)
flour tortilla (solid)
milk (liquid)
orange juice (liquid)
pepperoni (solid)
yogurt (semisolid)
```

From these examples it can be seen that many foods which could not be sterilized by short term treatments at even higher pressure can be sterilized at high pressure for longer periods such as the five to eight days used in these examples. The successful sterilization of mayonnaise containing products provides the opportunity for preserving such foodstuff which freezing does not allow. Salad dressing and mayonnaise products separate in the freezer and foodstuff made with such emulsion cannot be successfully stored in the freezer.

Tomatoes were successfully preserved with added vitamin C and citric acid which could not be preserved for short times at very high pressures as reported by others.

In some cases the vitamin C-citric acid mixture allows preservation that would otherwise not occur. Soybeans with vitamin C-citric acid were sterilized but not without such external addition.

Ocean foods, such as scallops and shrimp, even in vitamin C-citric acid medium are not sterilized. This is thought to be due to the fact that ocean bacteria live normally at pressures of at least 150 MPa in the deepest oceans. It should be noted however that while bacteria are not killed under the pressures used nevertheless they do not grow during this time. This is seen where the scallop and shrimp samples are degraded within one day of decompression while they were unaffected during a five day holding period. Thus seafood can be preserved for some time while being maintained under high pressure.

Pressure affects ripening and maturation of some foodstuffs but not other similar products. Inoki mushrooms without added water were of poor quality after pressure treatment and were not sterile. Common button mushrooms were sterile but slowly turned black. Shitaki mushroom were sterile and preserved in structure. Woodear mushrooms had firmness as well as structure.

Leafy products such as cilantro became brown with considerable loss of cellular matter. Cabbage on the other hand became lighter but remained firm.

The fact that pressure alone can be used and the fact that pressure can be generated easily by manual means recommends this method for preserving food for cases where electricity are not readily available. In some cases the quality of the product is better than that which can be provided by the canning process. In a preferred embodiment pressure for food preservation is generated by manual means. This can be accomplished by providing one or more pressure force amplifying cylinders.

Intermittent treatment with pressure was suggested by observations that spores were activate by pressure and was attempted by raising the pressure in milk samples to 25,000 psi and maintaining the pressure for 1 hour, on 3 successive days at 24 hours intervals. While it took some days for microbial growth to coagulate the milk, sterilization was not achieved by short term intermittent treatment. This and the many reports of unsuccessful preservation of food by high pressure treatment shows that the method required for obtaining sterilization is not obvious.

To improve the quality of foodstuff to be consumed by man where appearance is an important aspect of food quality, anti-oxidants are added to reduce discoloration and browning. Ascorbic acid is the preferred antioxidant but many other antioxidants can be used to accomplish. The amount of anti-oxidant required to be added depends on the foodstuff, its stage of ripeness, existing antioxidant activity, the amount of residual oxidants, and the rate of penetration of oxidizing species to the foodstuff through any packaging material. It is well with the art to know the type and amount of anti-oxidant needed for improving the aesthetic quality of foodstuff. The time course of pressurization is adjusted to allow the desired firmness of the foodstuff for those foodstuffs which are affected in shape or structure by the pressure application.

In another preferred embodiment green food coloring is added to green vegetables which have tend to brown discoloration during preservation.

Efficient and safe packaging of foodstuffs requires that the packaging materials be strong enough to sustain pressure for dry items. The shape of packages should accommodate the 5% to 7% reduction of liquid volume which occurs during the pressure stage. Thus packages for foodstuffs for human consumption will be opaque for items sensitive to light. Packets which can be layered to reduce external water volume and allow more material to be pressure treated in a given batch are a preferred embodiment. In some cases the quality of the preserved food needs to be seen by the purchaser in which case one side of the package or a portion of that side will be transparent.

Hand sealing packages may be needed for situation where heat sealing apparatus is not available, but heat sealed strong plastics are preferred. Heat sealing can be done with combustion-heated sealing devices as well as electrical devices. Strictly mechanical sealing is another preferred method for sealing packages where heat sealing is not feasible.

Vacuum sealing is preferred for dry objects and foodstuff to be preserved without added solution to initiate tight fitting of the container to the material being sterilized.

In addition to the preservation of foodstuffs, the method described herein is applicable to the sterilization of water for drinking.

An additional benefit of this method of foodstuff preservation is that impure water can be used as the water as well as the foodstuff is sterilized, although pathogen-free water is preferred. This applies as well to inanimate objects.

The method herein described is also suitable for the treatment of sewerage, thereby eliminating the need for the chlorination process and the resultant formation of suspected cancer causing organic chlorine compounds. Both solids with residual water and low solids effluent can be treated by this method. In a preferred embodiment low solids effluent is pressure treated in a continuous process wherein pressure concentrated energy is recovered in the fluid being reduced in pressure to pressurize incoming fluid. A sample of human feces was pressurized for 5 days at 25,000 psi. No bacterial growth or gas formation occurred in this sample.

In addition to having environmental benefits the methods disclosed provide considerable energy savings. The cost of pressurization is low. Having preserved foodstuff by the method disclosed refrigeration is not required. Overall shipping cost are less than for canned goods because less liquid is need for many products and plastic packaging is lighter than metal cans.

In a commercial setting pressure energy savings can be obtained by having a plurality of pressure chambers. For a five day pressure treatment cycle, 20% of the pressure chambers are pressurized on the first day. On 3 subsequent days an additional 20% are so treated. On the fifth day the first 20% set of chambers are used to pressurize the last 20%. Either of two methods can be used. In one case some of the chambers to be pressurized are partially pressurized in decreasing pressure levels so that chambers being brought to ambient pressure can be serially connected to those being pressurized. In the other case chamber being reduced to ambient are serially connected to those being pressurized. In this latter case as an example, a first decompressing chamber at 20,000 psi is connect to a first compressing chamber so that each reaches 10,000 psi at equilibrium. Next the 10,000 psi decompresing chamber is connected to a second ambient compressing chamber so that each becomes 5,000 psi. The first compressing chamber is connected to a second decompressing chamber so that each becomes 15,000 psi. This process continues so that decompressing chamber are connected serially to compressing chambers from 3 to 10 times allowing savings of from 40% to 90% of the energy needed to compress the final 20% of chambers from ambient to high final pressure. On subsequent days other decompresing sets of chamber are similarly used to compress the next set. In the first method the set to be compressed are partially compressed so that each can be serially connected to the decompressing set. In both methods each compressing chamber must be pressurized from the equilibrium level with its last equilibrated decompresing chamber to the final compressing pressure. For large sets of chambers the energy needed to compress from the last equilibration between a decompressing chamber and a compressing chamber to the final pressure represent most of the energy needed for the preservation process.

The inability of pressure resistant bacteria to grow in yogurt suggest the use of yogurt to assist in pressure preservation. White grapes, beef, and emu meat were successfully sterilized by pressure treatment.

Chicken meat presents a difficult product for pressure preservation. While showing no gas production chichen meat becomes soft where preserved in yogurt. Chicken surrounded in wine and pressure treated remains firm. Chicken when held at pressure for 12 days shows no degradation when recovered at ambient pressure suggesting long-term storage at pressure as with some seafood.

In general a majority of fruits, vegetables and foodstuff and some meats can be sterilized with retention of physical food characteristics by the method disclosed. Some foodstuff can be preserved by application of pressure when preserved in lemon, vinegar, yogurt or wine based marinade. For a few foodstuffs preservation requires that the foodstuff be maintained under pressure until it is to be cooked or consumed. It is anticipated that cooked foodstuffs which would not otherwise be sterilized by pressure alone can be preserved after being cooked. This is seen in the successful preservation of chicken salad.

In a preferred embodiment the sterilization method described is utilized for feedstuff as well as foodstuff In another preferred embodiment the sterilization method is applied to nutrient matter and to non-foodstuff and non-feedstuff matter that when surrounded by liquid medium and subjected to pressure sterilizes the matter.

Thus having described my invention I claim the following methods and products.

I claim:

1. A process for preserving a food product comprising the sequential steps of:
   a. placing said food product in a compressible package and closing said package,
   b. placing said food product containing package under a pressure of 25,000 psi,
   c. holding said food product in said package at said pressure of 25,000 psi and a temperature of 18–23 degrees C. for a time period of at least 5 days, and then
   d. reducing said pressure to ambient pressure.

2. The process according to claim 1, wherein after said pressure is reduced, said food product is stored in said package at ambient pressure.

3. The process according to claim 1, wherein said food product is maintained at said pressure until it is cooked or consumed.

4. The process according to claim 1, wherein said food product is selected from the group consisting of fruits, vegetables, meat and dairy products.

5. process according to claim 1 wherein said food product is selected from the group consisting of fruit and vegetable and is treated prior to said holding step with at least one substance selected from the group consisting of vitamin C and citric acid in an amount sufficient to prevent surface discoloration of said food product.

6. The process according to claim 1, wherein said food product is mixed with a marinade prior to said holding step such that the marinated food product is subjected to said holding step; said marinade having a major marinade component selected from the group consisting of yogurt, vinegar of final concentration greater than 1% acetic acid, lemon juice, and wine.

\* \* \* \* \*